US006483495B2

(12) United States Patent
Kaise et al.

(10) Patent No.: US 6,483,495 B2
(45) Date of Patent: Nov. 19, 2002

(54) LIQUID CRYSTAL DISPLAY DEVICE (75) Inventors: Yasuyoshi Kaise; Kenichi Ishiguro; Yasushi Kubota, all of Nara (JP)

(73) Assignee: Sharp Kabushiki Kaisha, Osaka (JP)

(*) Notice: Subject to any disclaimer, the term of this patent is extended or adjusted under 35 U.S.C. 154(b) by 0 days.

(21) Appl. No.: 09/883,263

(22) Filed: Jun. 19, 2001

(65) Prior Publication Data

US 2001/0055010 A1 Dec. 27, 2001

(30) Foreign Application Priority Data

Jun. 19, 2000 (JP) .................................... 2000-183843

(51) Int. Cl.[7] ................................................ G09G 3/36
(52) U.S. Cl. ......................... 345/93; 345/87; 349/151
(58) Field of Search ............................... 345/87, 92, 93, 345/98, 99, 100, 102, 204, 205, 206, 214; 349/1, 158, 151

(56) References Cited

U.S. PATENT DOCUMENTS

| 5,668,032 A | * | 9/1997 | Holmberg et al. | .......... 438/149 |
| 5,670,994 A | * | 9/1997 | Kawaguchi et al. | ........ 345/206 |
| 6,025,901 A | * | 2/2000 | Adachi et al. | .............. 349/151 |
| 6,295,046 B1 | * | 9/2001 | Hebiguchi | .................. 345/100 |

FOREIGN PATENT DOCUMENTS

| JP | 6-242457 | 9/1994 |
| JP | 6-95185 | 11/1994 |
| JP | 7-270825 | 10/1995 |
| JP | 9-152620 | 6/1997 |
| JP | 11-202366 | 7/1999 |
| JP | 2000-275607 | 10/2000 |

* cited by examiner

Primary Examiner—Bipin Shalwala
Assistant Examiner—Mansour M. Said
(74) Attorney, Agent, or Firm—Nixon & Vanderhye P.C.

(57) ABSTRACT

A liquid crystal display device comprises a base substrate including a display region, and a drive circuitry region provided in a surrounding region of the display region, a liquid crystal layer, and a counter substrate facing the base substrate via the liquid crystal layer. A pixel electrode and a pixel driving element for driving the pixel electrode are provided in the display region, a driving circuitry section for controlling the pixel electrode and the pixel driving element is provided in the drive circuitry region. An insulating layer is provided to cover at least one portion of the drive circuitry region. A common transition electrode is provided in the insulating layer. The common transition electrode is electrically connected to a counter electrode provided on the counter substrate.

12 Claims, 10 Drawing Sheets

LIQUID CRYSTAL DISPLAY DEVICE

BACKGROUND OF THE INVENTION

1. Field of the Invention

The present invention relates to a liquid crystal display device comprising drive circuitry including an active element, and a pixel driving element, the drive circuitry and the pixel driving element being formed on the same substrate. More particularly, the present invention relates to a liquid crystal display device in which a common transition electrode is disposed via an insulating layer in a drive circuit region in which drive circuitry is provided.

2. Description of the Related Art

A liquid crystal display device is known as a device for displaying images. The liquid crystal display device displays images by controlling a voltage applied across liquid crystal material interposed between a base substrate and a counter substrate.

One type of a liquid crystal display device is an active matrix type liquid crystal display device. An active matrix type liquid crystal display device includes a thin film transistor (TFT) preferably used as a switching element for driving a pixel having steep on-off characteristics. Therefore, an active matrix type liquid crystal display device has high-speed response and can have a large number of pixels, resulting in a large-size and high-definition display.

Hereinafter, an active matrix type liquid crystal display device in a driver monolithic form will be described. The phrase "driver monolithic forms" means that a driver and pixel electrodes controlled by the driver are provided on the same substrate. Images are displayed on the liquid crystal display device by the driver controlling pixel electrodes.

Figure 7:
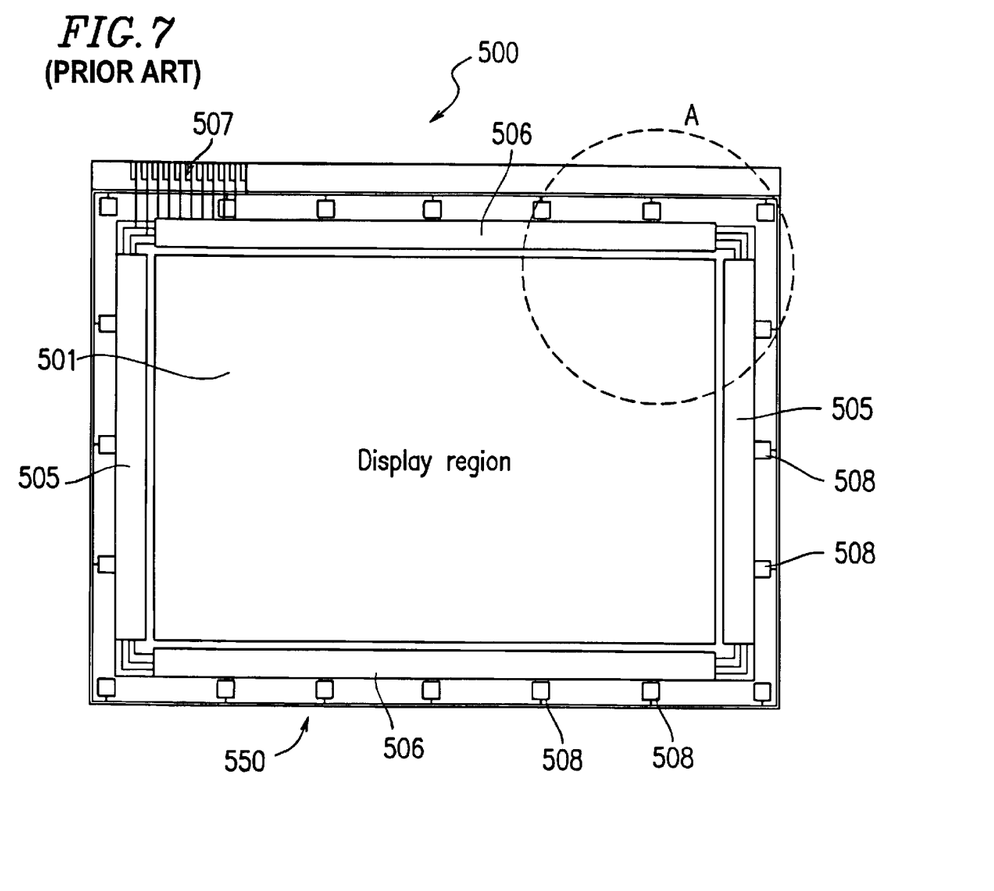
FIG. 7 is a top view of a base substrate of an active matrix type liquid crystal display device in a conventional driver monolithic form.

FIG. 7 is a top view of a base substrate 550 of an active matrix type liquid crystal display device 500 in a conventional driver monolithic form.

A display region 501 is provided in a middle portion of a surface of the base substrate 550 facing a counter substrate (not shown in FIG. 7). Referring to FIG. 7, a scanning driver 505 and a data driver 506 are provided around the display region 501. A plurality of common transition electrodes 508 are provided at a further peripheral region of the base substrate 550 than the scanning driver 505 and the data driver 506. A signal input terminal 507 provided on a portion of the peripheral region supplies power to a counter electrode (not shown) on the counter substrate through the common transition electrodes 508. The common transition electrodes 508 are electrically connected to a peripheral portion of the counter electrode via conductive paste.

Figure 8:
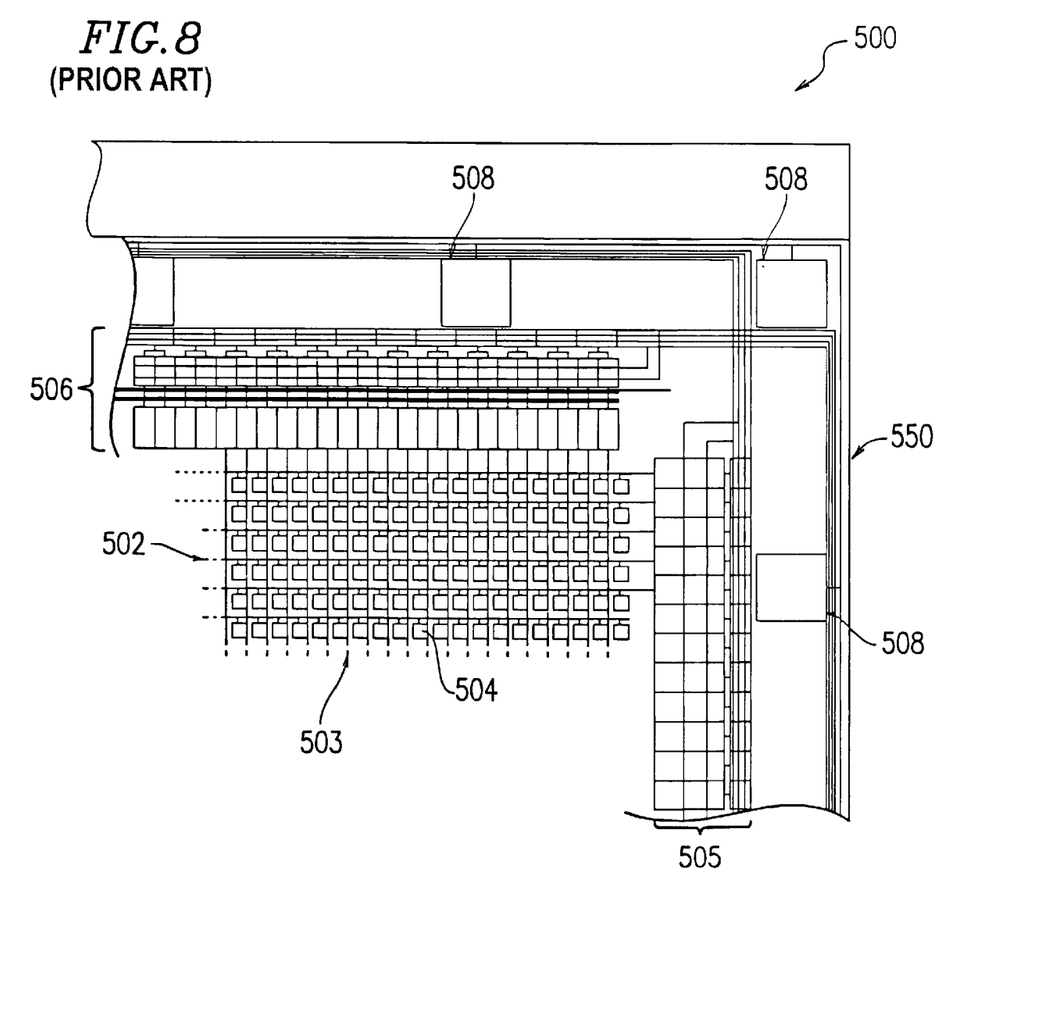
FIG. 8 is an enlarged diagram of a portion A of FIG. 7.

FIG. 8 is an enlarged diagram of a portion A (FIG. 7) of the base substrate 550 of the liquid crystal display device 500. Referring to FIG. 8, in the display region 501, a plurality of scanning signal lines 502 and a plurality of data signal lines 503 are provided in such a manner as to intersect. The pixel driving elements (e.g., TFTs) and pixel electrodes 504 are arranged in a matrix, each pair of which are provided in the vicinity of an intersection. The gate electrodes of the TFTs provided on the same row are connected to a common scanning signal line 502. The scanning signal line 502 on each row is connected to the scanning driver 505. The drain (or source) electrodes of the TFTs provided on the same column are connected to a common data signal line 503. The source (or drain) electrodes of the TFTs are connected to the pixel electrode 504. The data signal line 503 on each column is connected to the data driver 506.

The scanning driver 505 progressively scans the scanning signal lines 502 (a scanning signal line 502 is provided in each row). The data driver 506 is controlled so that image data is progressively applied from the data signal lines 503 to the respective pixel electrodes 504 via the TFTs, thereby displaying images in the display region 501.

Typically, the counter electrode provided on the counter substrate is a transparent electrode made of ITO (indium tin oxide) or the like. The electric resistance of the counter electrode is relatively large. Particularly in a large-sized liquid crystal display device, brightness gradation, irregular display, or the like may occur due to a delay of a polarity inversion signal caused by distributed resistance in the counter electrode and liquid crystal capacitance. To avoid this, for example, the common transition electrodes 508 are provided at a plurality of portions of the base substrate 550. In the case of a liquid crystal display device using TAB (tape automated bonding), the pitch of the TAB is narrowed so that a common transition electrode is provided between the TABs. However, in a typical liquid crystal display device in a driver monolithic form, a plurality of the common transition electrodes 508 are provided at a further peripheral region of the base substrate 550 than the scanning driver 505 and the data driver 506.

Recently, the miniaturization of devices is in increasing demand. An even smaller size liquid crystal display device is desired. In a liquid crystal display device, the area of the display region 501 viewed by a user should be increased as much as possible while the surrounding region of the display region 501 which has substantially no contribution to display is reduced as much as possible.

Needless to say, the same applies to the above-described active matrix type liquid crystal display device 500 in the driver monolithic form. A portion having substantially no contribution to display, in which the drive circuitry including the scanning driver 505 and the data driver 506 and the common transition electrodes 508 are provided, can be reduced with respect to the display region 501.

However, when a plurality of the common transition electrodes 508 are provided outside the scanning driver 505 and the data driver 506 in the liquid crystal display device 500, the width of the peripheral portion of a liquid crystal display device, which has substantially no contribution to display, is significantly increased.

Further, when conductive paste is applied to the common transition electrodes 508 using a printing process, static electrical charge tends to occur. Such static electrical charge is likely to cause fluctuation of the threshold of an active element in a circuit in the vicinity of the common transition electrode 508. Particularly when the threshold fluctuation occurs in a switching element for sampling in the data driver 506 within the active matrix type liquid crystal display device 500 in the driver monolithic form, a sampling level to image display data is varied for each data signal line 503, so that display quality is significantly reduced.

Further, when conductive paste is applied to the common transition electrodes 508, excessive charge transfer occurs due to the potential (or charge quantity) difference between a glass substrate and an application device. This charge transfer is likely to cause a change in characteristics, such as threshold fluctuation, of an active element within a circuit in the vicinity of the common transition electrode 508.

The data driver 506 includes an active element other than the switching element for sampling. For example, a logic circuit such as a shift register circuit within the data driver 506 includes an active element. The logic circuit is only required to transfer and/or identify a digital signal expressed by 0 or 1. Therefore, a certain degree of a threshold fluctuation of an active element in the logic circuit does not have a substantial influence on display quality.

The switching element for sampling needs to charge each data signal line 503 with analog image display data in a certain limited time, e.g., about 160 ns for a QVGA display format. When threshold fluctuation occurs in the switching element for sampling, the sampling level to the image display data is varied for each data signal line 503 due to a difference in a charge capability between each element. Therefore, a display quality is significantly reduced.

SUMMARY OF THE INVENTION

According to one aspect of the present invention, a liquid crystal display device comprises a base substrate including a display region, and a drive circuitry region provided in a surrounding region of the display region, a liquid crystal layer, and a counter substrate facing the base substrate via the liquid crystal layer. A pixel electrode and a pixel driving element for driving the pixel electrode are provided in the display region. A driving circuitry section for controlling the pixel electrode and the pixel driving element is provided in the drive circuitry region. An insulating layer is provided to cover at least one portion of the drive circuitry region. A common transition electrode is provided in the insulating layer. The common transition electrode is electrically connected to a counter electrode provided on the counter substrate.

The drive circuitry region includes data drivers for converting serial data to parallel data so as to drive data signal lines, conductor sections between the data drivers, scanning drivers for driving scanning signal lines, and conductor sections between the scanning drivers. The data driver may include a shift register, a buffer circuit section, a sample holding circuit section (including a latch circuit section for latching a digital signal), and a DAC circuit section for converting a digital signal to an analog signal. The scanning driver may include a shift register and a buffer circuit section.

In this configuration, the common transition electrode is provided via the insulating film in the drive circuitry region. Therefore, it is possible to prevent a threshold fluctuation of an active element in the drive circuitry due to static electric charge generated in the common transition electrode. A reduction in liquid crystal display quality can also be prevented. Further, the common transition electrode can be efficiently provided in the drive circuitry region, thereby reducing the surrounding region of a display region of the liquid crystal display device which has substantially no contribution to display. Therefore, the liquid crystal device can be miniaturized.

In one embodiment of this invention, the drive circuitry section includes a plurality of types of active elements. The common transition electrode is provided on a portion of the insulating layer corresponding to the drive circuitry region other than a portion of the drive circuitry region. On the portion of the drive circuitry region, a specific type(s) of active element(s) out of the plurality of types of active elements is provided.

In one embodiment of this invention, the specific type of the active element is a switching element for sampling.

The specific type of active element may be, for example, an active element in a shift register circuit or a buffer circuit, for example.

A common transition electrode is provided via an insulating film in a drive circuitry region which does not include an active element (or a specific active element). Therefore, it is possible to prevent a threshold fluctuation of an active element due to static electric charge generated in the common transition electrode. A reduction in liquid crystal display quality can also be prevented. Further, the common transition electrode can be efficiently provided in the drive circuitry region, thereby reducing the surrounding region of a display region of the liquid crystal display device which has substantially no contribution to display. Therefore, the liquid crystal display device can be miniaturized.

The above-described drive circuitry region for display includes a scanning driver for driving a scanning signal line and a data driver for driving a data signal line. In the data driver, a sample holding circuit as well as a shift register circuit are provided. A threshold fluctuation of an active element other than the switching element for sampling included in the sample holding circuit of the data driver does not have a substantial influence on display quality. Therefore, when the common transition electrode is provided via the insulating layer on a portion of the drive circuitry region which does not include the switching element for sampling, i.e., the drive circuitry region other than the sample holding circuit (e.g., a shift register circuit), threshold fluctuation of the switching element for sampling can be suppressed, resulting in stable display quality. The surrounding region of a display region of the liquid crystal display device which has substantially no contribution to display can be reduced, thereby making it possible to miniaturize the liquid crystal display device.

In one embodiment of this invention, a plurality of drive circuitry sections and a plurality of conductors connecting the plurality of drive circuitry sections are provided in the drive circuitry region. The common transition electrode is provided on a portion of the insulating layer corresponding to a portion of the driving circuitry region. On the portion of the driving circuitry, at least one portion of the conductors is provided.

In this configuration, an array pitch in a drive circuit section of each predetermined drive circuit is reduced, thereby providing a conductor region. A common transition electrode is provided via an insulating film on the conductor region. Therefore, the common transition electrode is provided via the insulating film in a portion of the drive circuitry region which does not include an active element.

In one embodiment of this invention, the drive circuitry section includes a scanning driver for driving a scanning signal line and a data driver for driving a data signal line. At least one of the scanning driver and the data driver includes a shift register circuit having at least one stage. An array pitch of the stage in the shift register circuit is less than an array pitch of the pixel electrode connected to the scanning signal line and/or the data signal line.

With this configuration, an array pitch in a drive circuit section is reduced, thereby easily providing a conductor region.

In one embodiment of this invention, the common transition electrode is shaped so as to be a rectangular, a annular, or a stripe.

The drive circuitry region includes a scanning driver for driving a scanning signal line and a data driver for driving a data signal line. The scanning driver is provided opposite vertical ends of a display panel while the data driver is provided on opposite horizontal ends of the display panel, for example. In this case, the stripe-shaped common transition electrode provided throughout the drive circuitry region includes a stripe-shaped portion thereof provided across a scanning driver region at the left side of the display panel, a stripe-shaped portion thereof provided across a scanning driver region at the right side of the display panel, a stripe-shaped portion thereof provided across a data driver region at the top side of the display panel, and a stripe-shaped portion thereof provided across a data driver region at the bottom side of the display panel. The present invention is not limited to this. The stripe-shaped common transition electrode may be any one of the above-described portions, or may be contiguous and extends annularly throughout the peripheral portion of the display panel.

With this configuration, the stripe-shaped common transition electrode is provided throughout the drive circuitry region, thereby causing additive capacitance on the drive circuitry to be uniform. Therefore, a more stable display quality can be achieved.

Thus, the invention described herein makes possible the advantages of providing a liquid crystal display device in which a surrounding region of a display region which has substantially no contribution to display is decreased without a reduction in display quality so that the liquid crystal display device can be miniaturized.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the accompanying drawings.

EXAMPLE 1

Figure 1A:
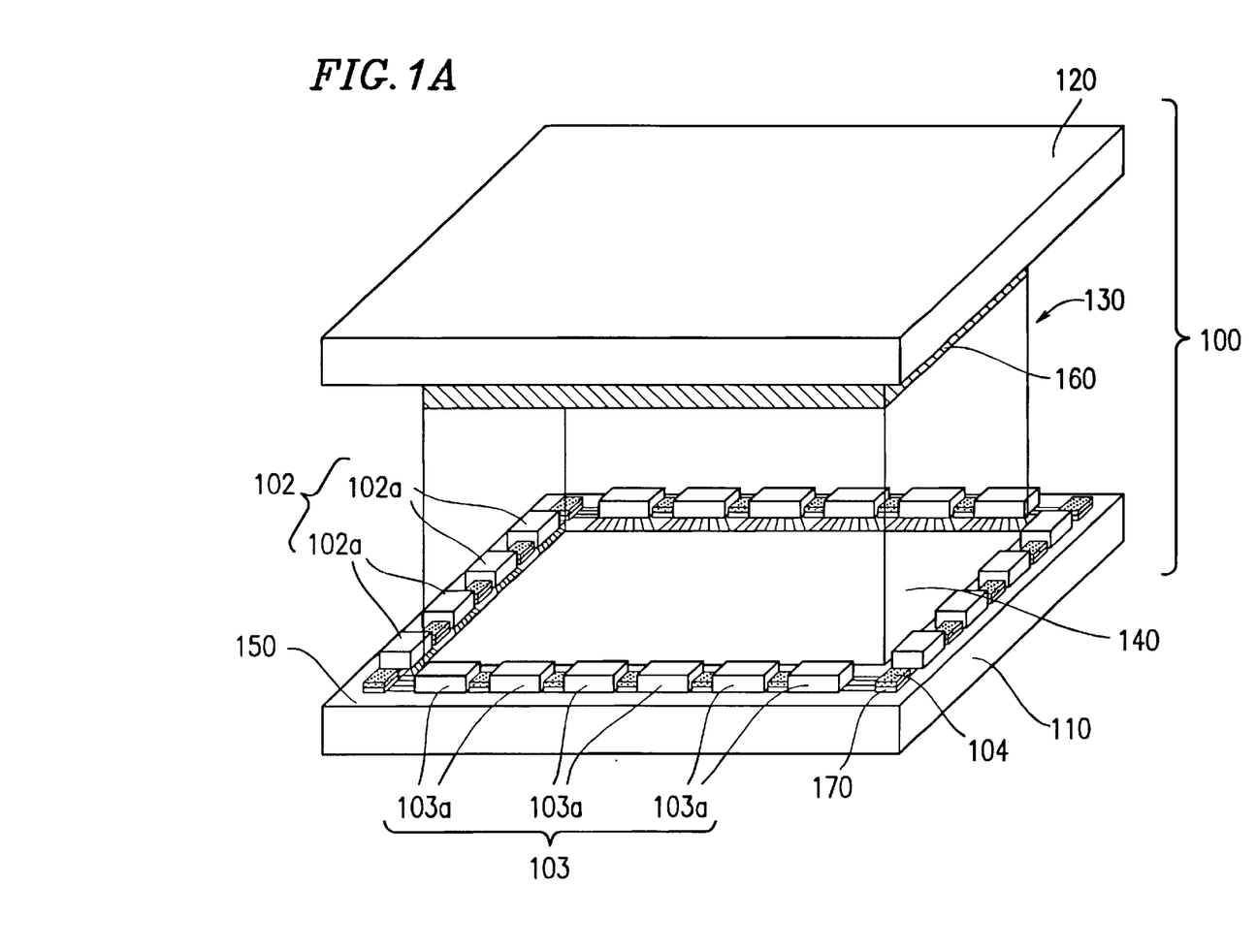
FIG. 1A is a perspective view schematically showing an active matrix type liquid crystal display device according to Example 1 of the present invention.

FIG. 1A is a perspective view schematically showing an active matrix type liquid crystal display device 100. The liquid crystal display device 100 includes a base substrate 110, a counter substrate 120, and a liquid crystal layer 130 interposed between the base substrate 110 and the counter substrate 120. The liquid crystal layer 130 includes a liquid crystal material. The base substrate 110 includes a display region 140 and a drive circuitry region 150. In the drive circuitry region 150, a scanning driver 102 and a data driver 103 are provided. Pixel electrodes (not shown in FIG. 1A but described later) are provided on the base substrate 110. On the counter substrate 120, a counter electrode 160 is provided on a surface facing the pixel electrodes. The liquid crystal layer 130 is controlled by a voltage applied between the pixel electrode and the counter electrode 160.

Figure 1B:
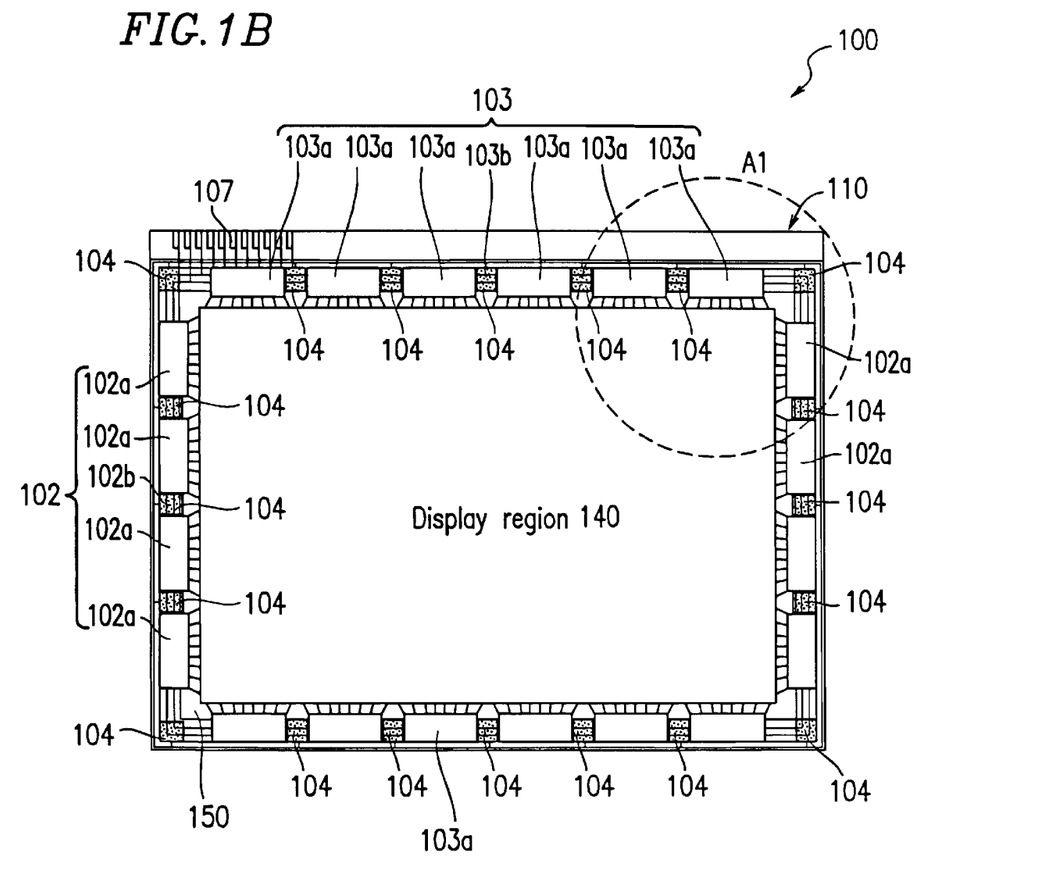
FIG. 1B is a top view showing a base substrate of the liquid crystal display device of FIG. 1A.

FIG. 1B is a top view showing the base substrate 110 of the liquid crystal display device 100 according to Example 1 of the present invention.

Referring to FIG. 1B, the scanning driver 102 and the data driver 103 which control the liquid crystal display device 100 are provided in the drive circuitry region 150 which is provided in a surrounding portion of the display region 140 of the base substrate 110 in the liquid crystal display device 100. The scanning driver 102 and the data driver 103 function as drive circuitry. The scanning driver 102 includes a plurality of scanning driver sections 102a and a plurality of conductors 102b connecting the scanning driver sections 102a to each other. The data driver 103 includes a plurality of data driver sections 103a and a plurality of conductors 103b connecting the data driver sections 103a to each other.

A plurality of common transition electrodes 104 are provided via an insulating film (not shown in FIG. 1B, but described later) on the conductors 103b between each data driver section 103a. Similarly, a plurality of common transition electrodes 104 are provided via an insulating film (not shown in FIG. 1B) on the conductors 102b between each data driver section 102a. Each of the common transition electrodes 104 supplies electric charge from a signal input terminal 107 to the counter electrode 160 on the counter substrate 120.

Figure 2A:
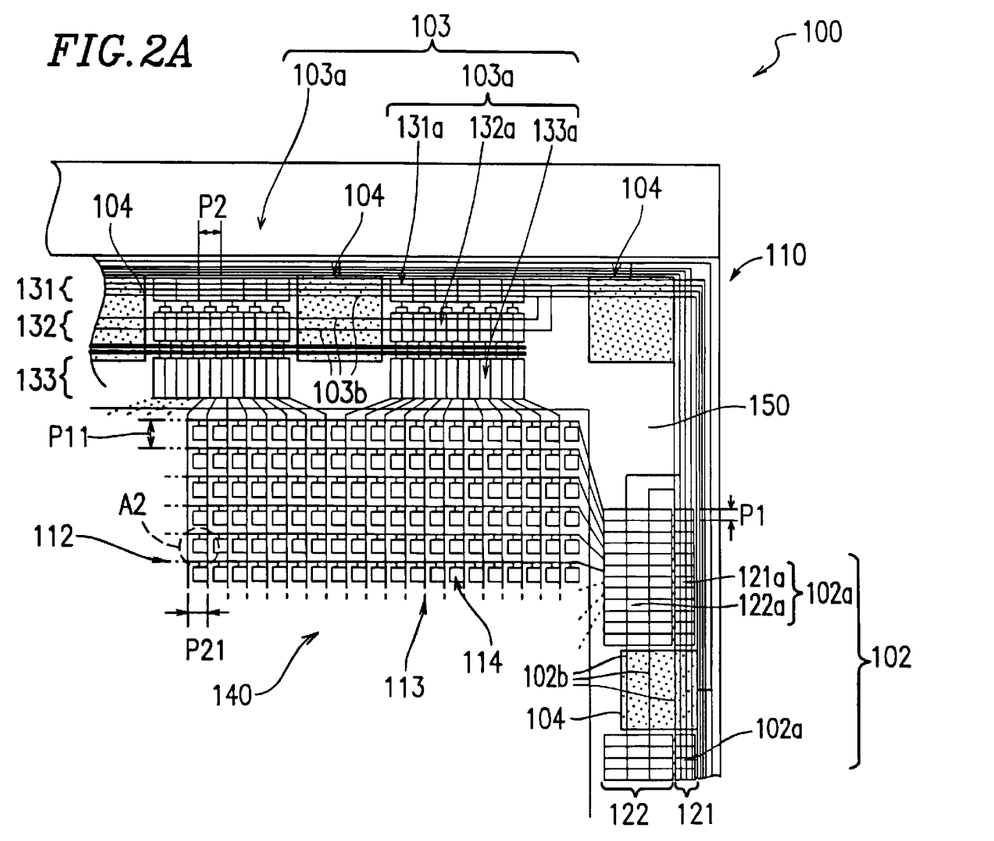
FIG. 2A is an enlarged view of a portion A1 of FIG. 1B.

FIG. 2A is an enlarged view of a portion A1 of FIG. 1B and a top view showing a configuration of the liquid crystal display device 100 in the vicinity of the display region 140 and the drive circuitry region 150.

In the display region 140, a plurality of scanning signal lines 112 and a plurality of data signal lines 113 intersect substantially orthogonally. A pixel electrode 114 and a pixel driving element 180 (not shown in FIG. 2A) are provided in the vicinity of each intersection. The pixel electrodes 114 are arranged in a matrix.

Figure 2B:
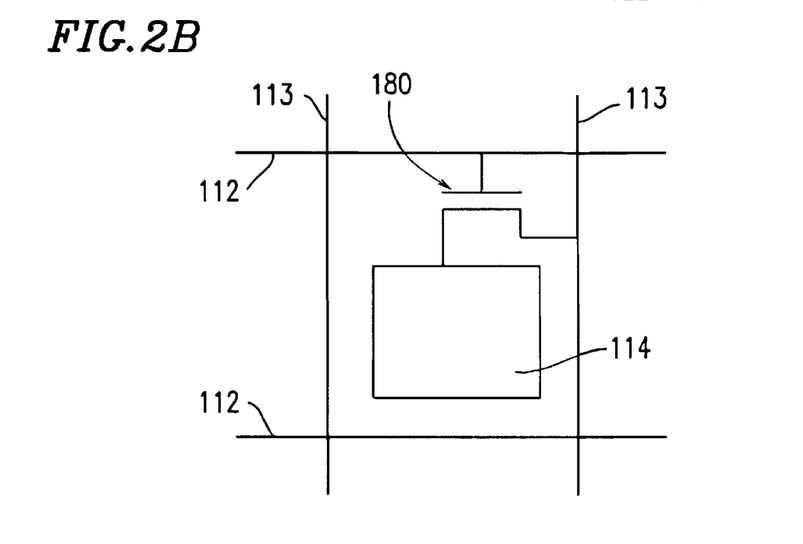
FIG. 2B is a diagram showing a configuration of signal lines and a pixel driving element.

FIG. 2B is an enlarged view of a portion A2 of FIG. 2A, showing a configuration of the scanning signal lines 112, the data signal lines 113, the pixel electrodes 114, and the pixel driving elements 180. The pixel driving elements 180 may be TFTs, for example. The pixel driving elements 180 are controlled in response to the signal level of the scanning signal lines 112, so that data signals are stored via the data signal lines 113 in the pixel electrodes 114.

In the drive circuitry region 150, the scanning driver 102 includes a shift register circuit 121 and a buffer circuit 122. The shift register circuit 121 outputs a sampling signal which is an evenly spaced pulse signal in order for the buffer circuit 122 to progressively drive the scanning signal lines 112. Further, the buffer circuit 122 includes an inverter and progressively outputs scanning signals to the scanning signal lines 112 in accordance with the sampling signals from the shift register circuit 121. The shift register circuit 121 is of a small transistor size.

The scanning driver section 102a includes a shift register circuit section 121a having a predetermined number (two or more) of stages and a buffer circuit section 122a having a predetermined number (two or more) of stages corresponding to those of the shift register circuit section 121a. The scanning driver section 102a including the shift register circuit section 121a and the buffer circuit section 122a drives corresponding pixel electrodes 114. Referring to FIG. 2A, one stage in the scanning driver section 102a corresponds to one scanning signal line 112.

The array pitch P1 of the stage in the shift register circuit section 121a is set to be less than the array pitch P11 of the scanning signal line 112 connected to the pixel electrode 114 driven by an output of the shift register circuit section 121a (i.e., the vertical array pitch of the pixel electrode 114 in the display region 140). One stage in the buffer circuit section 122a is provided within the array pitch P1.

As described above, the array pitch of the stage in the scanning driver section 102a is set to be less than the array pitch of the pixel electrode 114. Therefore, the size of the scanning driver section 102a including the shift register circuit section 121a having a predetermined number of stages and the buffer circuit section 122a having the predetermined number of stages is less than the size of corresponding pixel electrodes 114. As shown in FIG. 1A, the scanning driver sections 102a are arranged with spaces therebetween. This is because, the total length of all rows (or the total length of all of the vertical array pitches of the pixel electrodes 114) in the display region 140 is more than the total length of all of the scanning driver sections 102a.

In this manner, the stages in the shift register circuit sections 121a and the stages in the buffer circuit sections 122a are arranged, so that the scanning driver sections 102a each work individually in the scanning driver 102. The conductors 102b are provided between each scanning driver section 102a. A common transition electrode 104 is provided via an insulating film on the conductors 102b between each scanning driver section 102a.

Figure 2C:
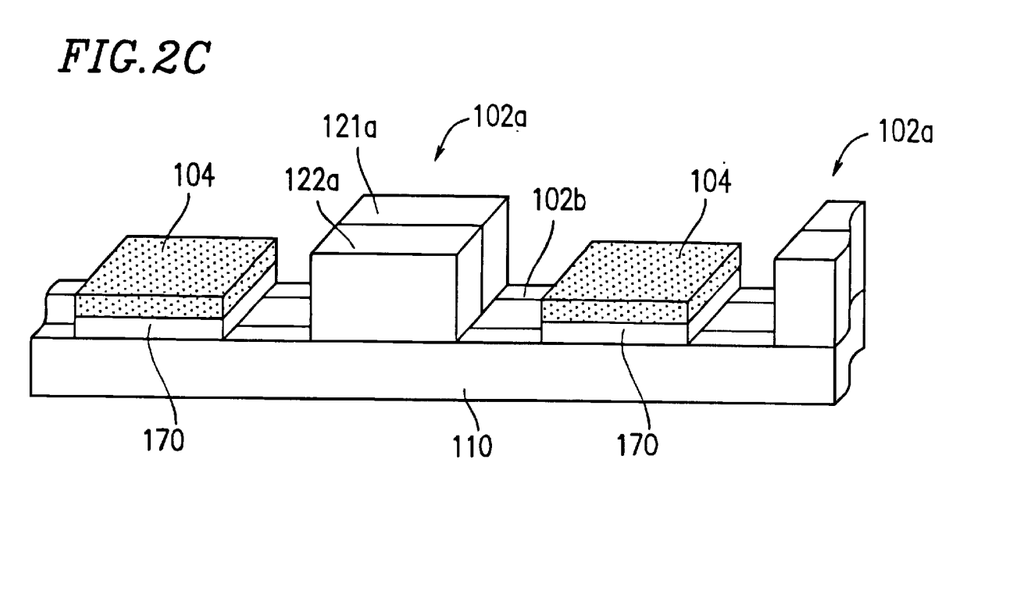
FIG. 2C is a perspective view showing a vicinity of a scanning driver of FIG. 1B.

FIG. 2C is a perspective view of the drive circuitry region 150 in which the common transition electrodes 104 are provided via an insulating film 170 on the conductors 102b provided between each scanning driver section 102a. The shift register circuit section 121a and the buffer circuit section 122a are not provided under the common transition electrodes 104.

Referring to FIGS. 1A, 1B, and 2A again, in the drive circuitry region 150, the data driver 103 includes a shift register circuit 131, a buffer circuit 132, and a sample holding circuit 133 (FIG. 2A). The shift register circuit 131 outputs a sampling signal which is an evenly spaced pulse signal in order for the sample holding circuit 133 to progressively sample a video signal. The buffer circuit 132 includes an inverter. The buffer circuit 132 is required to drive the sample holding circuit 133 of a large transistor size in accordance with an output signal of the shift register circuit 131 of a small size. The sample holding circuit 133 includes a switching element for sampling a video signal. The switching element for sampling is an active element. The switching element for sampling is used to store image information contained in the video signal in each data signal line 113. The ON/OFF operation of the switching element for sampling is controlled by a sampling signal output from the buffer circuit 132.

The data driver section 103a includes a shift register circuit section 131a having a predetermined number (two or more) of stages, a buffer circuit section 132a having a predetermined number (two or more) of stages corresponding to the respective stages of the shift register circuit section 131a, and a sample holding circuit section 133a having a predetermined number (two or more) of stages corresponding to the respective stages of the buffer circuit section 132a. The data driver section 103a drives corresponding pixel electrodes 114. Referring to FIG. 2A, a set of one stage in the shift register circuit section 131a, one stage in the buffer circuit section 132a, and one stage in the sample holding circuit section 133a in the data driver section 103a corresponds to one data signal line 113.

An array pitch P2 of the stage in the shift register circuit section 131a is set to be less than an array pitch P21 of the pixel electrode 114 connected to a data signal line 113 driven by an output of a stage in the shift register circuit section 131a. One stage in the buffer circuit section 132a and one stage in the sample holding circuit section 133a are provided within the array pitch P2.

As described above, the array pitch P2 of the stage in the data driver section 103a is set to be less than the array pitch P21 of the pixel electrode 114. Therefore, the size of the data driver section 103a including the shift register circuit section 131a, the buffer circuit section 132a, and the sample holding circuit section 133a is less than the size of the corresponding pixel electrodes 114. As shown in FIG. 1A, the data driver sections 103a are arranged with spaces therebetween. This is because the total length of all columns (or the total length of all of the horizontal array pitches of the pixel electrode 114) in the display region 140 is more than the total length of all of the data driver sections 103a.

In this manner, the shift register circuit sections 131a, the buffer circuit sections 132a, and the sample hold circuit sections 133a are arranged, so that the data driver sections 103a each operate individually in the data driver 103. The conductors 103b are provided between each data driver section 103a. A common transition electrode 104 is provided via an insulating film on the conductors 103b between each data driver section 103a.

Figure 2D:
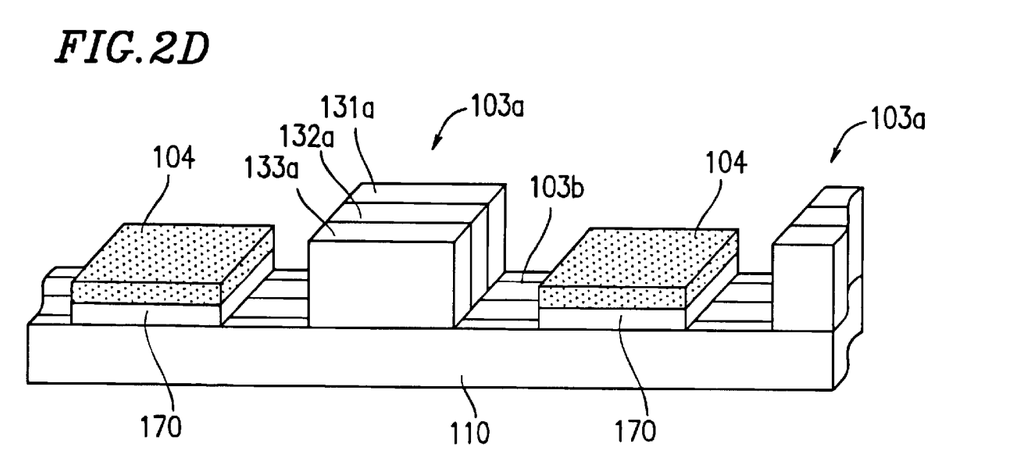
FIG. 2D is a perspective view showing a vicinity of a data driver of FIG. 1B.

FIG. 2D is a perspective view of the drive circuitry region 150 in which the common transition electrodes 104 are provided via an insulating film 170 on the conductors 1o3b provided between each data driver section 103a. The shift register circuit section 131a, the buffer circuit section 132a, and the sample hold circuit section 133a are not provided under the common transition electrodes 104.

In Example 1, the common transition electrodes 104 are provided via the insulating film 170 on the conductor regions (102b, 103b) obtained by causing the array pitch of the stage in the driving circuit (scanning driver section 102a and the data driver section 103a) in a predetermined range of the scanning driver 102 and the data driver 103 to be smaller than the array pitch of the pixel electrode 114. In the drive circuitry region 150 provided outside the display region 140, the conductors of the scanning driver 102 or the data driver 103 and the common transition electrodes 104 are provided via the insulating film 170 on the same plane. Therefore, a threshold fluctuation of the active elements of the drive circuitry due to a static electrical charge of the common transition electrode 104 can be suppressed, thereby preventing a reduction in liquid crystal display quality. Further, the common transition electrodes 104 can be efficiently superposed on the conductor regions in the drive circuitry region. Therefore, the surrounding region of the display region 140 having substantially no contribution to display can be reduced, thereby making it possible to miniaturize the liquid crystal display device 100.

In Example 1, the common transition electrodes 104 are provided in both the region including the scanning driver 102 and the region including the data driver 103. However, the present invention is not limited to this. The common transition electrodes 104 may be provided only in the region including the scanning driver 102 or the region including the data driver 103.

In Example 1, the array pitch P1 of the stage of the shift register circuit 121 in the scanning driver 102 is less than the array pitch P11 of the scanning signal line 112 driven by the stage in the scanning driver 102, while the array pitch P2 of the shift register circuit 131 in the data driver 103 is less than the array pitch P21 of the data signal line 113 driven by the stage in the data driver 103. The present invention is not limited to such a configuration. For example, the common transition electrodes 104 may be provided only in the shift register circuit section 121 and/or the shift register circuit section 131.

EXAMPLE 2

In Example 2, common transition electrodes are provided via an insulating film on a portion of a drive circuitry region in which a predetermined active element (a switching element for sampling in a sample holding circuit) is not provided.

Figure 3:
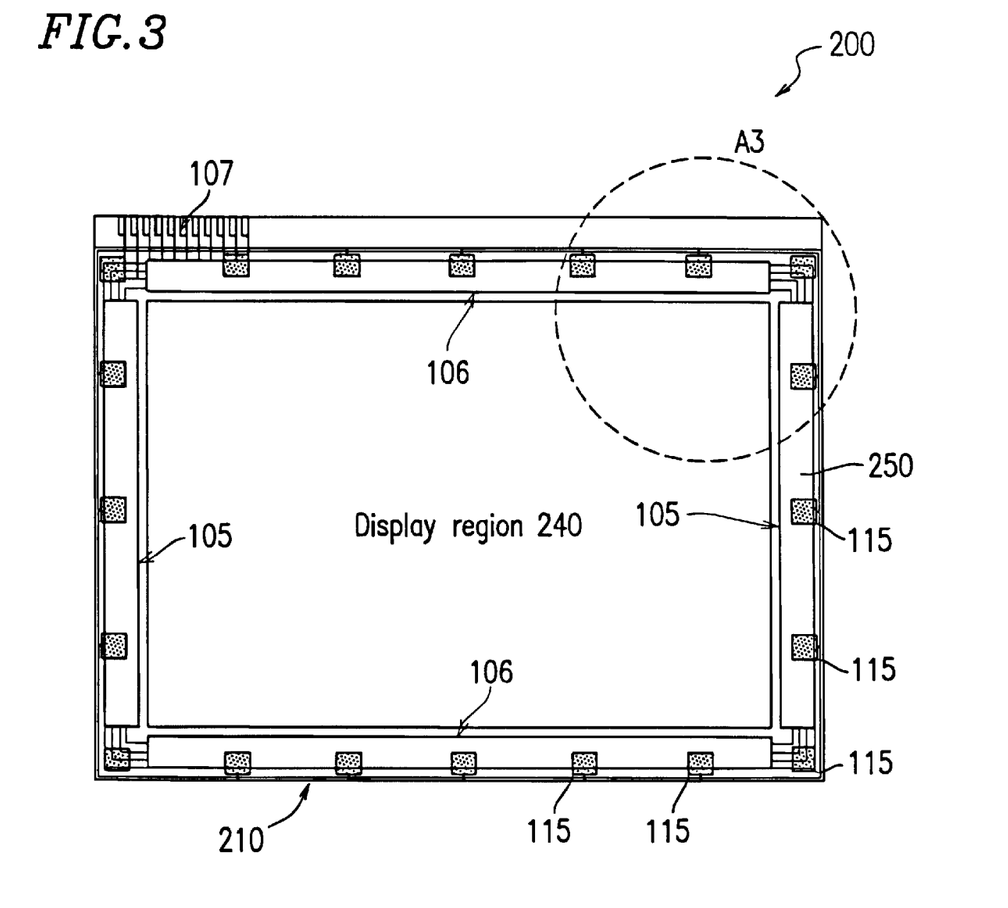
FIG. 3 is a top view of a base substrate of a liquid crystal display device according to Example 2 of the present invention.

FIG. 3 is a top view of a base substrate 210 of a liquid crystal display device 200 according to Example 2 of the present invention. The base substrate 210 of the liquid crystal display device 200 has the same configuration as that of the liquid crystal display device 100 of Example 1, except for an arrangement of a data driver 105, a scanning driver 106, an insulating film (not shown in FIG. 3), and a common transition electrode 115 on the base substrate 210.

The base substrate 210 includes a display region 240 and a drive circuitry region 250. In the drive circuitry region 250 of the base substrate 210 of FIG. 3, two scanning drivers 105, two data drivers 106, and a plurality of common transition electrodes 115 are provided. The common transition electrodes 105 each supply electric charge from a signal input terminal 107 to a counter electrode (not shown in FIG. 3) on a counter substrate (not shown in FIG. 3).

Figure 4A:
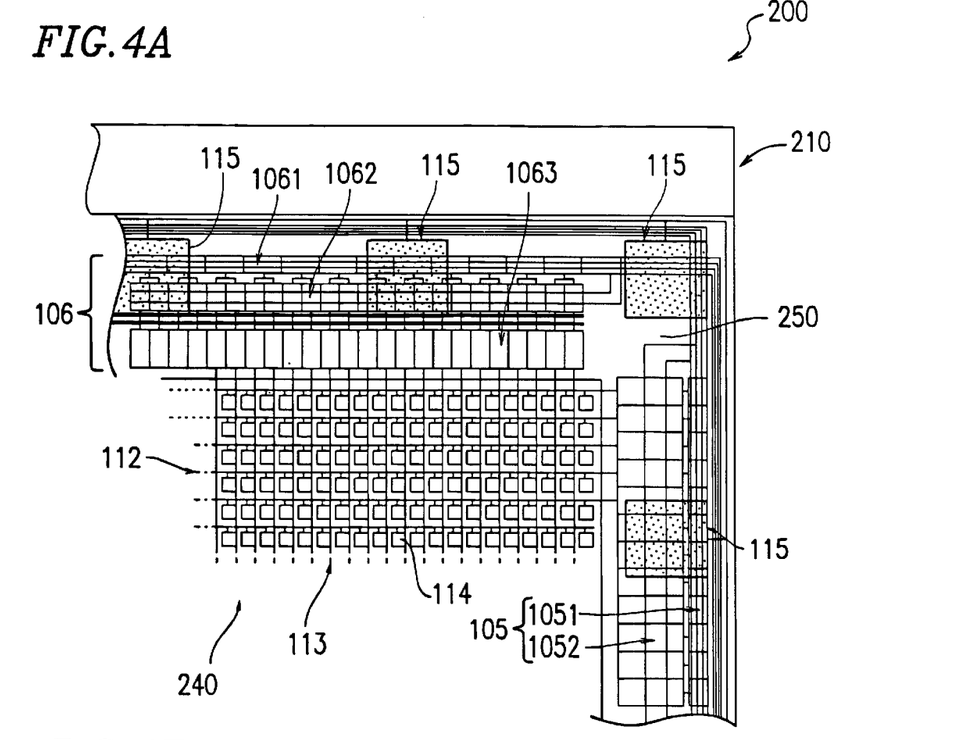
FIG. 4A is an enlarged view of an portion A3 of FIG. 3.

FIG. 4A is an enlarged view of a portion A3 of FIG. 3, showing a configuration of the base substrate 210 of the liquid crystal display device 200 in the vicinity of a boundary between the display region 240 and the drive circuitry region 250. It should be noted that parts having the same functions as those of corresponding parts of FIGS. 1B and 2A are referred to by the same reference characters. Descriptions thereof are omitted. For the sake of simplicity, each driver and circuit are only schematically shown in FIGS. 3, 4A, 4B, and 4C.

The scanning driver 105 includes a shift register circuit 1051 and a buffer circuit 1052. The data driver 106 includes a shift register circuit 1061, a buffer circuit 1062, and a sample holding circuit 1063.

Figure 4B:
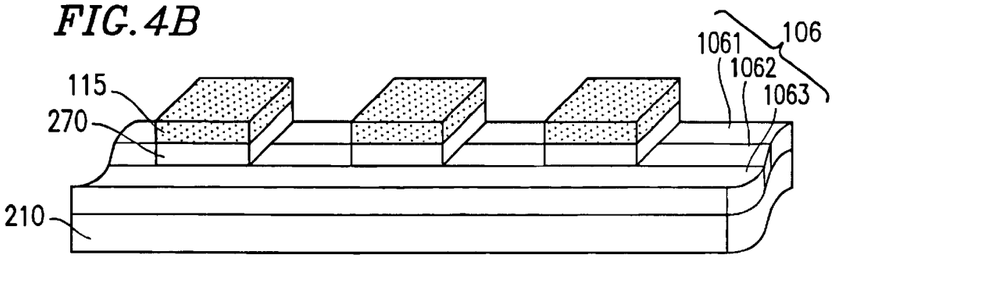
FIG. 4B is a perspective view schematically showing a vicinity of a data driver of FIG. 4A.

FIG. 4B is a perspective view of a vicinity of the data driver 106 in which a plurality of common transition electrodes 115 are provided on an insulating film 270 which covers a shift register circuit 1061 and a buffer circuit 1062.

Referring to FIG. 4B, similar to Example 1, a common transition electrode 115 is provided via the insulating film 270 on a portion of the drive circuitry region 250 in which a switching element for sampling in the sample holding circuit 1063 is not provided, i.e., the shift register circuit 1061 and the buffer circuit 1062 other than the sample holding circuit 1063. Whereas the switching element for sampling in the sample holding circuit 1063 included in the data driver 106 has a substantial influence on display quality, active elements other than the switching element for sampling (e.g., active elements in the shift register circuit 1061) do not have a substantial influence on display quality even if a certain degree of threshold fluctuation occurs therein.

Figure 4C:
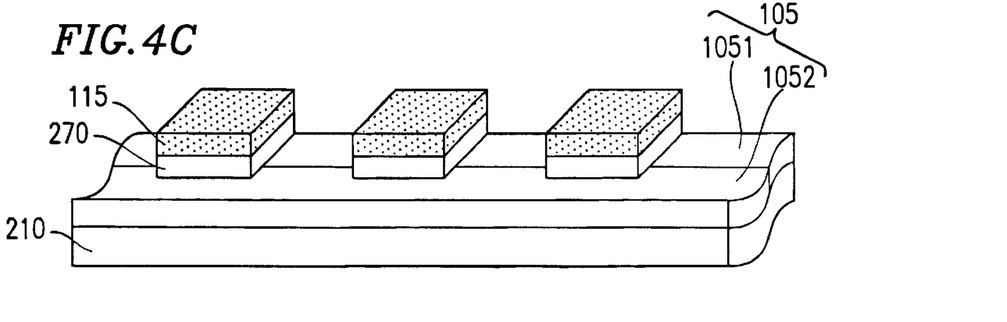
FIG. 4C is a perspective view schematically showing a vicinity of a scanning driver of FIG. 4A.

FIG. 4C is a perspective view showing a vicinity of the scanning driver 105. In FIG. 4C, a plurality of common transition electrodes 115 are provided via an insulating film 270 on the shift register circuit 1051 and the buffer circuit 1052. The present invention is not limited to this. For example, the common transition electrodes 115 may have a rectangular or circular shape.

According to Example 2, the common transition electrodes 115 are efficiently provided in the drive circuitry region 250 in such a manner as to prevent a threshold fluctuation of the switching elements for sampling within the sample holding circuits 1061. The surrounding portion of the display region 240 of the base substrate 210 of the liquid crystal display device 200 can be reduced, thereby making it possible to miniaturize the liquid crystal display device 200.

EXAMPLE 3

In Example 3, the common transition electrode 115, which is a plurality of rectangular pieces in Example 2, is modified so as to be an annular stripe throughout a data driver 305 and a scanning driver 306.

Figure 5:
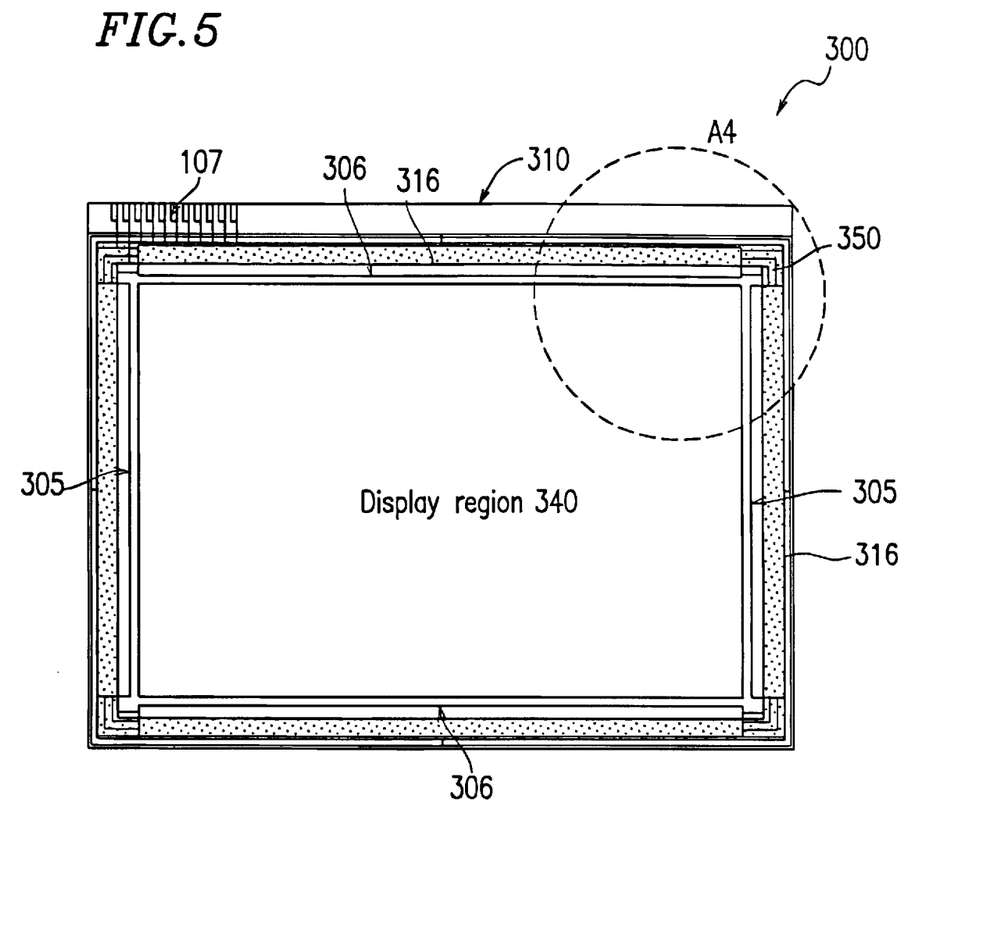
FIG. 5 is a top view of a base substrate of a liquid crystal display device according to Example 3 of the present invention.

FIG. 5 is a top view of a base substrate 310 of a liquid crystal display device 300 according to Example 3 of the present invention. The base substrate 310 of the liquid crystal display device 300 has the same configuration as that of the base substrate 110 of the liquid crystal display device 100 of Example 1, except for an arrangement of a data driver 305, a scanning driver 306, an insulating film (not shown in FIG. 5), and a common transition electrode 316.

Figure 6A:
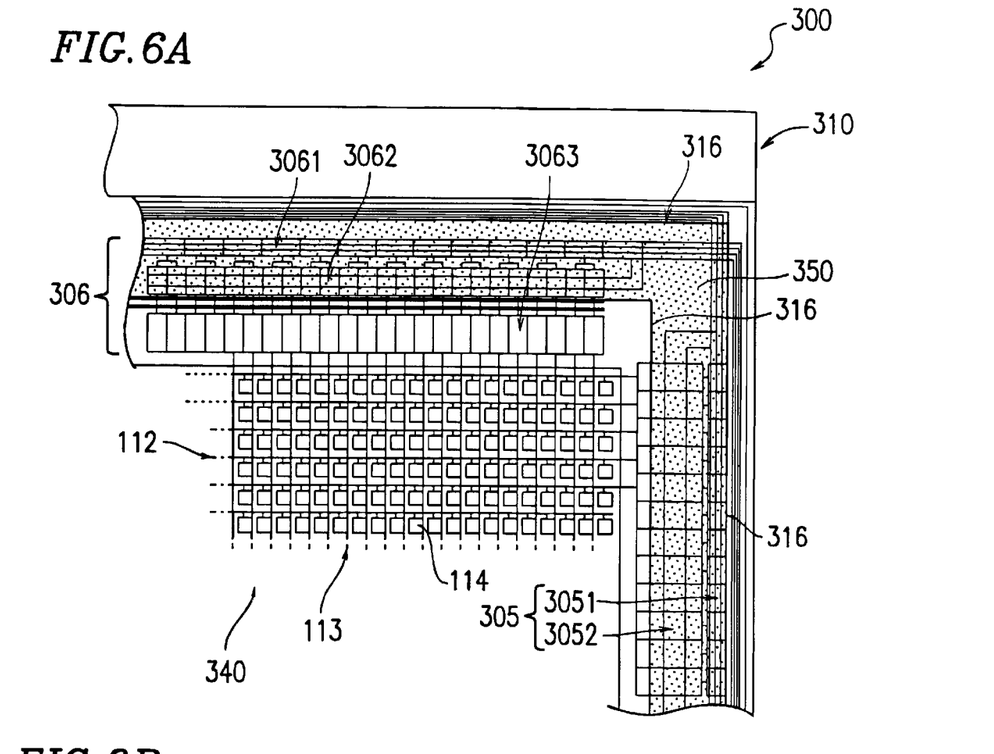
FIG. 6A is an enlarged view of an portion A4 of FIG. 5.

FIG. 6A is an enlarged view of an portion A4 of the base substrate 310 of the crystal display device 300 in FIG. 5, showing a specific configuration of the data driver 305, the scanning driver 306, and the common transition electrode 316. It should be noted that parts having the same functions as those of corresponding parts of FIGS. 1B and 2A are referred to by the same reference characters. Descriptions thereof are omitted. For the sake of simplicity, each driver and circuit are only schematically shown in FIGS. 5, 6A, 6B, and 6C.

The scanning driver 305 includes a shift register circuit 3051 and a buffer circuit 3052. The data driver 306 includes a shift register circuit 3061, a buffer circuit 3062, and a sample holding circuit 3063.

Referring to FIG. 6A, the common transition electrode 316 in the shape of an annular stripe is provided via an insulating film on the base substrate 310 of the liquid crystal display device 300, and more specifically on the shift register circuit 3051, the buffer circuit 3052,the shift register circuit 3061, and the buffer circuit 3062, except for the sample holding circuit 3063 of the data driver 306 in the drive circuitry, similar to Example 2.

Figure 6B:
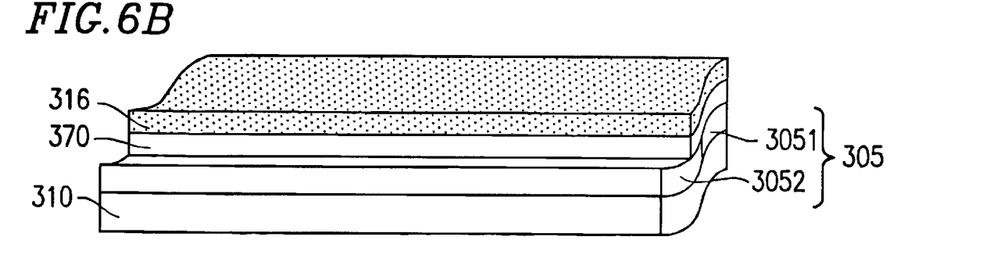
FIG. 6B is a perspective view schematically showing a vicinity of a data driver of FIG. 6A.

FIG. 6B is a perspective view schematically showing a structure of the drive circuitry region 350. In FIG. 6B, a scanning driver 305, an insulating film 370, and a common transition electrode 316 are provided on the base substrate 310. The stripe-shaped common transition electrode 316 is provided on the insulating film 370 covering circuits in the scanning driver 305 (e.g., the shift register circuit 3051 and the buffer circuit 3052).

Figure 6C:
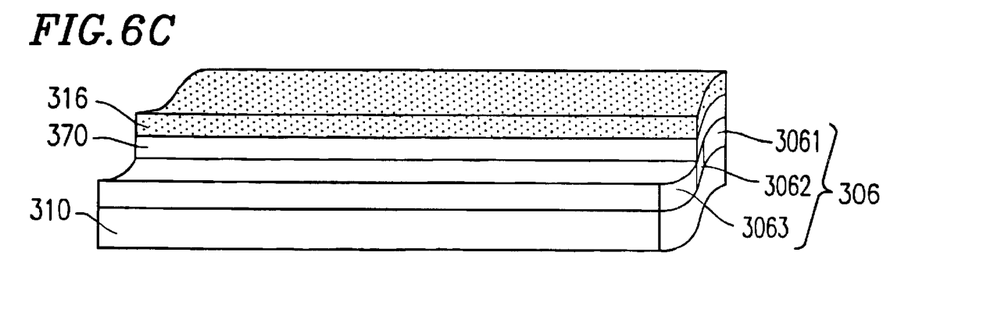
FIG. 6C is a perspective view schematically showing a vicinity of a scanning driver of FIG. 6A.

FIG. 6C is a perspective view schematically showing an arrangement of the data driver 306, the insulating film 370, and the common transition electrode 316. The stripe-shaped common transition electrode 316 is provided via the insulating film 370 on some circuits in the data driver 306 (e.g., the shift register circuit 3061 and the buffer circuit 3062), but is not provided on the sample holding circuit 3063.

With such an arrangement, the rectangular and annular uniform common transition electrode 316 can be provided on the scanning driver 305 and the data driver 306, thereby causing additive capacitance on the drive circuitry to be uniform. Therefore, more stable display quality can be achieved.

In Examples 1 through 3, a common transition electrode is provided on a drive circuitry region which does not include a predetermined active element (e.g., a switching element for sampling in a sample holding circuit) included in a data driver. The present invention is not limited to this. In the present invention, the common transition electrode may be provided via an insulating film on any portion of the drive circuitry region. In this case, it is also possible to prevent a threshold fluctuation of an active element due to static electric charge of the common transition electrode. For example, the common transition electrodes 316 may be shaped so as to be a rectangular, a annular, or a stripe.

According to the present invention, a common transition electrode is provided via an insulating film on a drive circuitry region. Therefore, it is possible to prevent a threshold fluctuation of an active element due to static electric charge generated in the common transition electrode. A reduction in liquid crystal display quality can also be prevented. Further, the common transition electrode can be efficiently provided in the drive circuitry region, thereby reducing the surrounding region of a display region of the liquid crystal display device which has substantially no contribution to display. Therefore, the liquid crystal display device can be miniaturized.

Further, according to the present invention, a common transition electrode is provided via an insulating film on a drive circuitry region which does not include an active element. Therefore , it is possible to prevent a threshold fluctuation of an active element due to static electric charge generated in the common transition electrode. A reduction in liquid crystal display quality can also be prevented. Further, the common transition electrode can be efficiently provided in the drive circuitry region, thereby reducing the surrounding region of a display region of the liquid crystal display device which has substantially no contribution to display. Therefore, the liquid crystal display device can be miniaturized.

Further, according to the present invention, an array pitch in a drive circuit section of each predetermined drive circuit is reduced, thereby providing a conductor region. A common transition electrode is provided via an insulating film on the conductor region.

Further, according to the present invention, an array pitch in a drive circuit section is reduced, thereby easily providing a conductor region.

Further, according to the present invention, a common transition electrode is provided via an insulating film on a drive circuitry region which does not include a switching element for sampling in a sample holding circuit. Therefore, a threshold fluctuation of the switching element for sampling can be suppressed, thereby making it possible to obtain stable liquid crystal quality. Further, the surrounding region of a display region of the liquid crystal display device which has substantially no contribution to display can be reduced, thereby making it possible to miniaturize the liquid crystal display device.

Further, according to the present invention, a stripe-shaped common transition electrode is provided throughout a drive circuitry region, thereby causing additive capacitance on the drive circuitry to be uniform. Therefore, more stable display quality can be achieved.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display device, comprising:
   a base substrate including a display region, and a drive circuitry region surrounding the display region;
   a liquid crystal layer; and
   a counter substrate facing the base substrate, with the liquid crystal layer provided between the counter substrate and the base substrate,
   wherein:
      at least one pixel electrode and at least one corresponding pixel driving element are provided in the display region;
      a driving circuitry section for controlling the pixel electrode and the pixel driving element is provided in the drive circuitry region;
      an insulating layer covers at least a portion of the drive circuitry region;
      at least one common transition electrode provided on the insulating layer;
      the common transition electrode is electrically connected to a counter electrode provided on the counter substrate; and
      wherein the common transition electrode is located at least partially peripherally inward of an outer periphery of the driver section.

2. A liquid crystal display device according to claim 1, wherein:
   the drive circuitry section includes a plurality of types of active elements; and
   the common transition electrode is provided on a portion of the insulating layer over the drive circuitry region and wherein a specific type(s) of active element(s) out of the plurality of types of active elements is provided in the drive circuitry region.

3. A liquid crystal display device according to claim 2, wherein the specific type of the active element is a switching element for sampling.

4. A liquid crystal display device according to claim 1, wherein:
   a plurality of drive circuitry sections and a plurality of conductors connecting the plurality of drive circuitry sections are provided in the drive circuitry region; and
   the common transition electrode is provided on a portion of the insulating layer corresponding to a portion of the drive circuitry region, wherein at least one portion of the conductors is provided in the drive circuitry region under the common transition electrode.

5. A liquid crystal display device according to claim 4, wherein:
  the drive circuitry section includes a scanning driver for driving a plurality of the scanning lines and a data driver for driving a plurality of the data signal lines;
  at least one of the scanning driver and the data driver includes a shift register circuit having at least one stage; and
  an array pitch of the stage in the shift register circuit is less than an array pitch of pixel electrodes connected to the scanning signal lines and/or the data signal lines.

6. A liquid crystal display device according to claim 1, wherein the common transition electrode is shaped so as to be rectangular, annular, or stripe-shaped.

7. The wherein the liquid crystal display device of claim 1, wherein the pixel driving element comprises a transistor.

8. A liquid crystal display comprising:
  first and second substrates with a liquid crystal material therebetween;
  a drive circuitry region including a plurality of scanning driver sections and a plurality of data driver sections, the drive circuitry region at least partially surrounding the display region;
  at least one common transition electrode supported by the first substrate and being electrically connected to a counter electrode supported by the second substrate;
  an insulation layer supported by the first substrate and being provided over at least part of the drive circuitry region; and
  wherein the common transition electrode is located on or over at least part of the insulation layer and at least partially between adjacent ones of the scanning driver sections and/or the data driver sections.

9. The display of claim 8, wherein no part of the common transition electrode is located peripherally outward of the respective peripheries of the scanning driver sections or the data driver sections.

10. The display of claim 8, wherein a shift register section and a buffer circuit section of one of the driver sections are both at least partially located between the common transition electrode and another common transition electrode.

11. The display of claim 8, further comprising a conductor located below each of the transition electrode and driver sections adjacent to the electrode.

12. The display of claim 8, where at least a part of the transition electrode is located peripherally inwardly of a periphery of at least one of the data driver sections and the scanning driver sections.

* * * * *